(12) United States Patent
Sharma et al.

(10) Patent No.: US 11,120,457 B2
(45) Date of Patent: Sep. 14, 2021

(54) CONTACT MANAGEMENT SUPPRESSION RULES SYSTEM

(71) Applicant: Adobe Inc., San Jose, CA (US)

(72) Inventors: Rina Sharma, Fremont, CA (US); Harminder Saini, San Jose, CA (US); Warren Weilun Lee, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 77 days.

(21) Appl. No.: 16/382,183

(22) Filed: Apr. 11, 2019

(65) Prior Publication Data

US 2020/0327559 A1    Oct. 15, 2020

(51) Int. Cl.
*G06Q 30/02* (2012.01)
*H04L 29/06* (2006.01)

(52) U.S. Cl.
CPC ............ *G06Q 30/02* (2013.01); *H04L 63/10* (2013.01)

(58) Field of Classification Search
None
See application file for complete search history.

(56) References Cited

U.S. PATENT DOCUMENTS

| 2005/0289000 A1* | 12/2005 | Chiang | G06Q 30/02 705/7.35 |
| 2009/0281931 A1* | 11/2009 | Axilrod | G06Q 40/06 705/30 |
| 2010/0036779 A1* | 2/2010 | Sadeh-Koniecpol | H04L 63/20 706/11 |
| 2012/0185275 A1* | 7/2012 | Loghmani | G06F 19/328 705/3 |

* cited by examiner

*Primary Examiner* — Chrystina E Zelaskiewicz
(74) *Attorney, Agent, or Firm* — FIG. 1 Patents

(57) ABSTRACT

A contact management suppression rules system is described. A centralized enterprise database stores suppression rules of an enterprise, where each suppression rule includes logic to prevent communication of marketing content to contacts satisfying parameters of the respective suppression rule. A suppression rules manager causes display of a real-time listing of the suppression rules in a graphical user interface displayed by at least one enterprise device, and receives, from the at least one enterprise device, a modification request to modify a parameter of a suppression rule. The modification request is initiated based on user input to the graphical user interface. The suppression rules stored in the centralized enterprise database are updated with the modified parameter of the suppression rule. Distribution of marketing content for a marketing campaign is controlled by preventing communication of the marketing content to contacts based on the updated suppression rules.

20 Claims, 10 Drawing Sheets

| | |
|---|---|
| Home | |
| Rule Definitions | |
| Modification Log | |
| Trends | |
| FAQ | |

North America ⌄   "X refers to the number of suppression days

| Suppression Rule | Suppression Rule Definition |
|---|---|
| Paid Suppression | The paid suppression rule suppresses contacts for a period of X days from the purchase of a particular product, subscription, or service. |
| Trial Suppression | The trial suppression rule suppresses contacts who have signed up for a trial subscription for a period of X days from the end of the trail period.5 |
| Free Suppression | The free suppression rule suppressed contacts who have signed up for a free account for a period of X days from the date that the contact signed up for the free account. |
| Mobile Suppression | The mobile suppression rule suppresses contacts who downloaded mobile apps of the enterprise for X days from the date that the contact downloaded the mobile app. |
| Launch Suppression | The launch suppression rule suppresses contacts who have launched a particular software application for X days from the date of the launch. |
| Sleeping Dog Suppression | The "sleeping dog" suppression rule that suppresses contacts with a high propensity to opt out from receiving marketing content for a period of X days |
| Universal Control Suppression | The "universal control" suppression rule suppresses a certain number of contacts in a "holdout group" from receiving any type of marketing content for X days. |

| Home |
| Rule Definitions |
| Modification Log |
| Trends |
| FAQ |

| North America ∨ |

*All changes made before 11:30am PST will get implemented same day. Read only access from 11:30 am PST to 12:30 pm PST

| Suppression Rule | Current Suppression Length | Suppression Length Suggested | Off/On | Suggested | Last Update (PST) | Modification Comments |
|---|---|---|---|---|---|---|
| Paid Suppression | 30 | 30 / 25 | ◉ | ◉ | 9/21/2018 | |
| Trial Suppression | 5 | 5 / 10 | ◉ | ◎ | 2/19/2019 | |
| Free Suppression | 22 | 22 / 16 | ◉ | ◉ | 9/17/2018 | |
| Mobile Suppression | 10 | 10 / 15 | ◎ | ◉ | 11/12/2018 | Turning Off to increase engagement for mobile users |
| Launch Suppression | 30 | 30 / 35 | ◉ | ◉ | 1/15/2019 | |
| Sleeping Dog Suppression | NA | NA / NA | ◉ | ◉ | 3/5/2019 | |
| Universal Control Suppression | 365 | 365 / 180 | ◉ | ◉ | 1/1/2018 | |

702 — 706 — 708 — 704

UPDATE

Fig. 7

CONTACT MANAGEMENT SUPPRESSION RULES SYSTEM

BACKGROUND

Advances in computing technology enable enterprise computing systems to distribute marketing content to users via an increasing number of different marketing channels and networks, such as email, social networks, and in-product push notifications. However, as the number of available communication channels expand, the complexity of marketing campaigns becomes increasingly difficult to control for conventional computing systems. This is particularly true for the computing systems of large enterprises which may provide a multitude of different products and services, each of which may be assigned a different team tasked with creating and managing the rules and data to control the marketing campaign. This results in a large amount of data that controls the distribution of marketing content being stored across the enterprise at several different data storage locations. This lack of a "single source of truth" leads to conflicts and confusion between the marketing rules and data of the enterprise. Moreover, resolution of such conflicts is difficult in conventional systems which fail to provide interfaces suitable to surface the rules for viewing and/or modification. Instead, conventional enterprise computing systems utilize a manual process which relies on dedicated programmers to search for, locate, and manually update the rules of the enterprise to resolve such conflicts and inaccuracies, as well as to update rules that are no longer current. Moreover, the inability to provide suitable interfaces for surfacing the rules of the enterprise lead to duplicative efforts by users who create new rules when a suitable rule may have been previously created by a programmer in a different department of the enterprise.

SUMMARY

To overcome these problems, a contact management suppression rules system is leveraged in a digital medium environment. The contact management suppression rules system includes a centralized enterprise database to store suppression rules of the enterprise. The suppression rules include logic to prevent the communication of marketing contact to contacts satisfying one or more parameters of the respective suppression rule. Unlike conventional solutions which make it difficult to view, manage, or modify suppression rules across an enterprise, the contact management suppression rules system leverages the suppression rules maintained in the centralized enterprise database to populate a graphical user interface that displays a real-time listing of the global suppression rules for the enterprise on secure enterprise devices that access the centralized enterprise database via a private enterprise network. Along with the suppression rules listing, the graphical user interface displays various parameters and characteristics of each suppression rule, such as a suppression rule definition, a length parameter associated with the suppression rule, or a state parameter of the suppression rule (e.g., enabled or disabled). In this way, enterprise users can quickly and easily view all of the global suppression rules for the enterprise along with suppression rule definitions, suppression rule parameters, and other characteristics.

Moreover, the graphical user interface enables users of the secure enterprise devices to efficiently modify various parameters of the suppression rules, such as the suppression rule length and the suppression rule state. To do so, the graphical user interface provides graphical controls to modify the suppression rule length and to toggle the suppression rules on or off. Thus, with just a few inputs to the graphical user interface, the enterprise users can quickly and efficiently modify the parameters of the suppression rules of the enterprise. The flexibility to modify suppression rule parameters is simply not available in conventional systems which instead require programmers to write or modify complex queries to change suppression rule parameters and logic.

A marketing communication manager of the suppression rules system controls the distribution of marketing content based on the suppression rules maintained in the centralized enterprise database of the enterprise. Generally, the marketing communication manager communicates campaigns containing marketing content to contacts via various communication channels, such as email, social networks, or in-product push notifications. As part of this, the marketing communication manager leverages the suppression rules stored in the centralized enterprise database and prevents the communication of marketing content to contacts that satisfy the logic and parameters of the suppression rules.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 5 depicts an example of the graphical user interface of contact management suppression rules system displaying suppression rule definitions.

FIG. 7 depicts an example of the graphical user interface of contact management suppression rules system displaying suppression rule suggestions.

DETAILED DESCRIPTION

Overview

Figure 1:
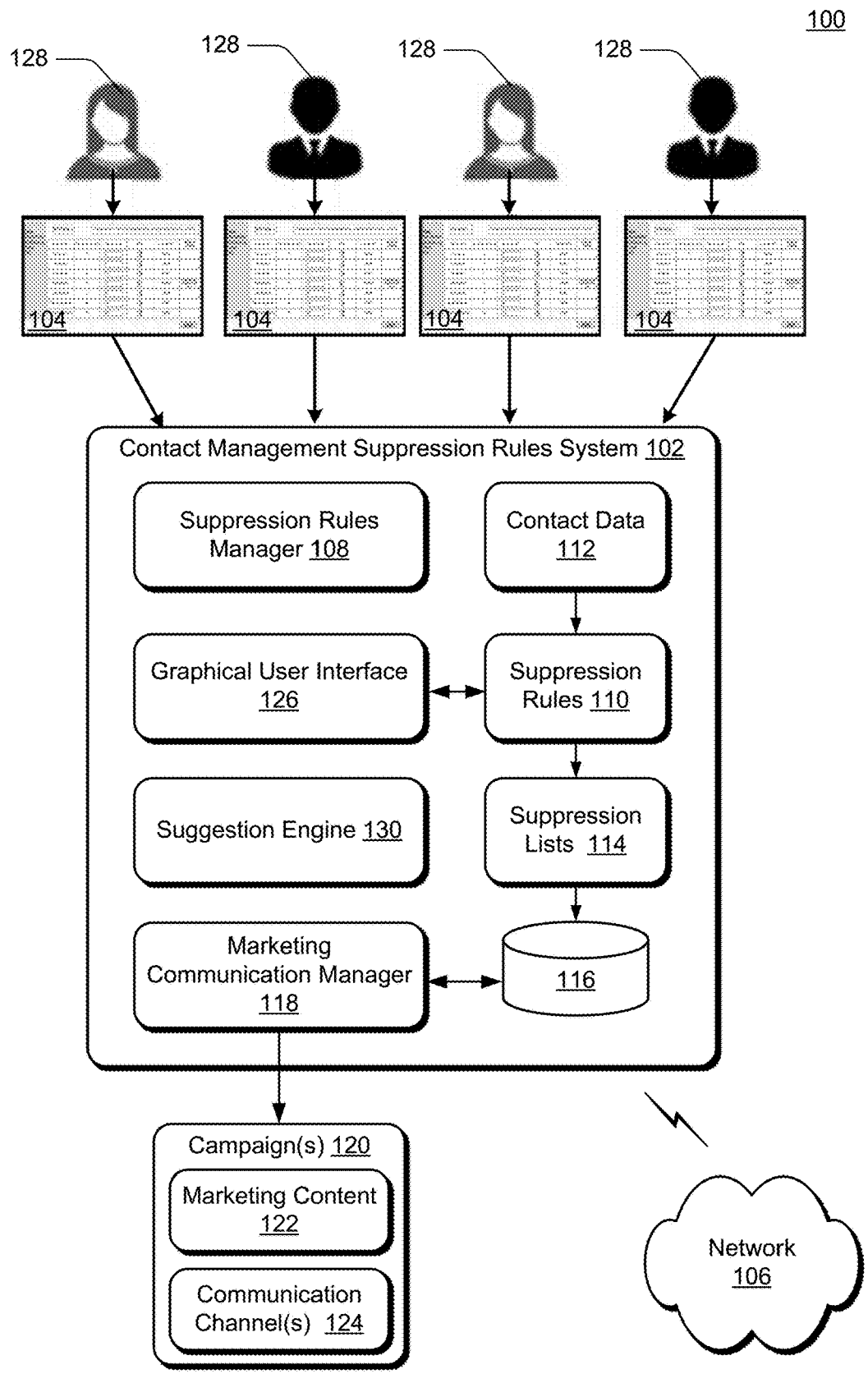
FIG. 1 is an illustration of an environment in an example implementation that is operable to employ a contact management suppression rules system described herein.

One way in which marketing campaigns can be controlled is through the creation and execution of suppression rules which may be utilized by an enterprise to prevent marketing content from being communicated to particular contacts for various reasons. Generally, suppression rules are created by an enterprise to prevent the communication of marketing content that is irrelevant or duplicative to contacts because such content may cause the contacts to perform an undesirable action, such as canceling subscriptions, unsubscribing from mailings lists, and so forth. Thus, well-crafted suppression rules prevent over-saturation of marketing content, which in turn ensures that the right contacts are receiving the marketing content and prevents cancellations, opt-outs, and low user interaction. However, conventional marketing tools and systems fail to provide interfaces suitable for accessing the rules and data that govern a marketing campaign, such as suppression rules. Instead, the code and data that fuels suppression rules in conventional computing systems is disseminated across several different data storage locations throughout an enterprise making it difficult to manage, track, and modify suppression rules.

To overcome these problems, a contact management suppression rules system is leveraged in a digital medium environment. The contact management suppression rules system collects global suppression rules from a variety of different sources corresponding to different campaigns and products across different marketing channels. Unlike conventional systems in which suppression rules are stored at multiple different locations across the enterprise, the contact management suppression rules system maintains the suppression rules in single centralized enterprise database which create a "single source of truth" for the suppression rules thereby enabling consistency in the marketing strategy for the enterprise across different campaigns and marketing channels.

As described herein, a suppression rule includes logic to prevent the communication of marketing content to contacts that satisfy the parameters of the suppression rule. Examples of suppression rule parameters include a length parameter of the suppression (e.g., a predefined number of days that the suppression rule is to be applied), a state of the suppression rule (e.g., whether the suppression rule is enabled or disabled), a product or service type (e.g., to apply the suppression rule to a specific product or service), and a contact type, to name just a few. The length parameter may correspond to a fixed date range or a length of time from a particular event. As an example, a suppression rule can be created to suppress contacts who have previously purchased a particular product from receiving marketing content for 30 days from the purchase date of the product. Notably, the suppression rules logic and parameters may include logic referencing a variety of different types of contact data including, by way of example and not limitation, contact actions, a date of the contact action, an identifier of the product or service associated with the contact action, a type of the product or service associated with the contact action, a type of the contact, a type of the contact's subscription, as well as contact information for the contact across different communication channels.

Unlike conventional solutions which make it difficult to view, manage, or modify suppression rules across an enterprise, the contact management suppression rules system leverages the suppression rules maintained in the centralized enterprise database to populate a graphical user interface that displays a real-time listing of the global suppression rules for the enterprise on secure enterprise devices that access the centralized enterprise database via a private enterprise network. Along with the suppression rules listing, the graphical user interface displays various parameters and characteristics of each suppression rule, such as a suppression rule definition, a length parameter associated with the suppression rule, or a state parameter of the suppression rule (e.g., enabled or disabled). In this way, enterprise users can quickly and easily view all of the global suppression rules for the enterprise along with suppression rule definitions, suppression rule parameters, and other characteristics.

Moreover, the graphical user interface enables users of the secure enterprise devices to efficiently modify various parameters of the suppression rules, such as the suppression rule length and the suppression rule state. The graphical user interface includes graphical controls to modify the suppression rule length and to toggle the suppression rules on or off. Thus, with just a few inputs to the graphical user interface, enterprise users can quickly and efficiently modify the parameters of the suppression rules of the enterprise. The flexibility to modify suppression rule parameters is simply not available in conventional computing systems which instead require programmers to write or modify complex queries to change suppression rule parameters and logic. Thus, the described techniques increase productivity across an enterprise by reducing both coding and execution time for suppression rules. The contact management suppression rules system may enable modification to a variety of different parameters of the suppression rules without departing from the spirit or scope of the techniques described herein.

The suppression rules system dynamically updates the suppression rules stored in the centralized enterprise database with the modified parameters in a timely manner, e.g., within one day. In order to improve transparency and accountability to suppression rule modifications, the suppression rules system can be configured to require that users provide a valid reason for the suppression rule modification in order for the modification to be applied by the suppression rules system. Moreover, any suppression rule modification triggers instantaneous communication of a notification to designated users in the enterprise indicating the suppression rule modification, the name of the user that made the modification, and the reasons for the suppression rules modification. The modification may also be automatically stored in a modification log in the centralized enterprise database which is viewable in the graphical user interface provided by the suppression rules system.

A marketing communication manager of the suppression rules system controls the distribution of marketing content based on the suppression rules maintained in the centralized enterprise database of the enterprise. Generally, the marketing communication manager communicates campaigns containing marketing content to contacts via various communication channels, such as email, social networks, or in-product push notifications. As part of this, the marketing communication manager leverages the suppression rules stored in the centralized enterprise database and prevents contacts that satisfy the logic and parameters of the suppression rules from receiving the marketing content of the campaign. Due to the speed in which the suppression rule modifications are applied, the suppression rules system ensures that changes to the suppression rules are applied consistently in a timely manner throughout the enterprise.

Thus, practical applications of the contact management suppression rules system include providing transparency, suppression rule definition uniformity through a "single source of truth", and data governance into a single centralized system that can be easily accessed via the graphical user interface to create, view, and modify the global suppression rules of the enterprise. As discussed above and below, this functionality can be useful for enterprises in order to prevent the communication of marketing content to contacts who should not be receiving marketing content for various reasons, thereby decreasing the likelihood of cancellations, opt-outs, and low user interaction responsive to marketing campaign distribution.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ a contact management suppression rules system as described herein. The illustrated environment 100 includes a contact management suppression rules system 102 implemented at one or more enterprise servers and various enterprise devices 104 that are communicatively coupled, one to another, via a private enterprise network 106, such as an intranet of the enterprise. Devices that are usable to implement the contact management suppression rules system 102 and enterprise devices 104 may be configured in a variety of ways. These devices, for instance, may be configured as a desktop computer, a laptop computer, a mobile device (e.g., assuming a handheld configuration such as a tablet or mobile phone), and so forth. Thus, the device may range from full resource devices with substantial memory and processor resources (e.g., personal computers, game consoles) to a low-resource device with limited memory and/or processing resources (e.g., mobile devices). Additionally, a device may be representative of a plurality of different devices, such as multiple servers utilized by a business to perform operations "over the cloud" as further described in relation to FIG. 10.

The devices may also be implemented as voice assistant devices which may be configured in a variety of ways. Generally speaking, the voice assistant devices are configured with one or more microphones to receive voice commands from a user. Examples of dedicated voice assistant devices include the Amazon® Echo and Google® Home, which enable interactions with voice assistant platforms Amazon® Alexa and Google® Assistant, respectively. Other devices, such as mobile phones, desktop computers, laptop computers, gaming systems, and so forth may also be configured as voice assistant devices capable of leveraging the functionality of a voice assistant platform. In such scenarios, the voice assistant platform may leverage native audio hardware of these devices to enable them to serve as voice assistant devices. In accordance with the techniques discussed herein, the enterprise device 104, for instance, may be capable of leveraging the functionality of a voice assistant platform. By way of example, various mobile phones may serve as voice assistant devices by including executable code that enables a user to interact with Cortana® a voice assistant platform of Microsoft®. As another example, an Apple® iPhone (a mobile phone) may serve as a voice assistant device, enabling a user to interact with the voice assistant platform Siri®. To this end, the voice assistant devices can be configured to receive user input through interfaces (e.g., touch, camera, etc.) in addition to receiving voice commands.

Figure 10:
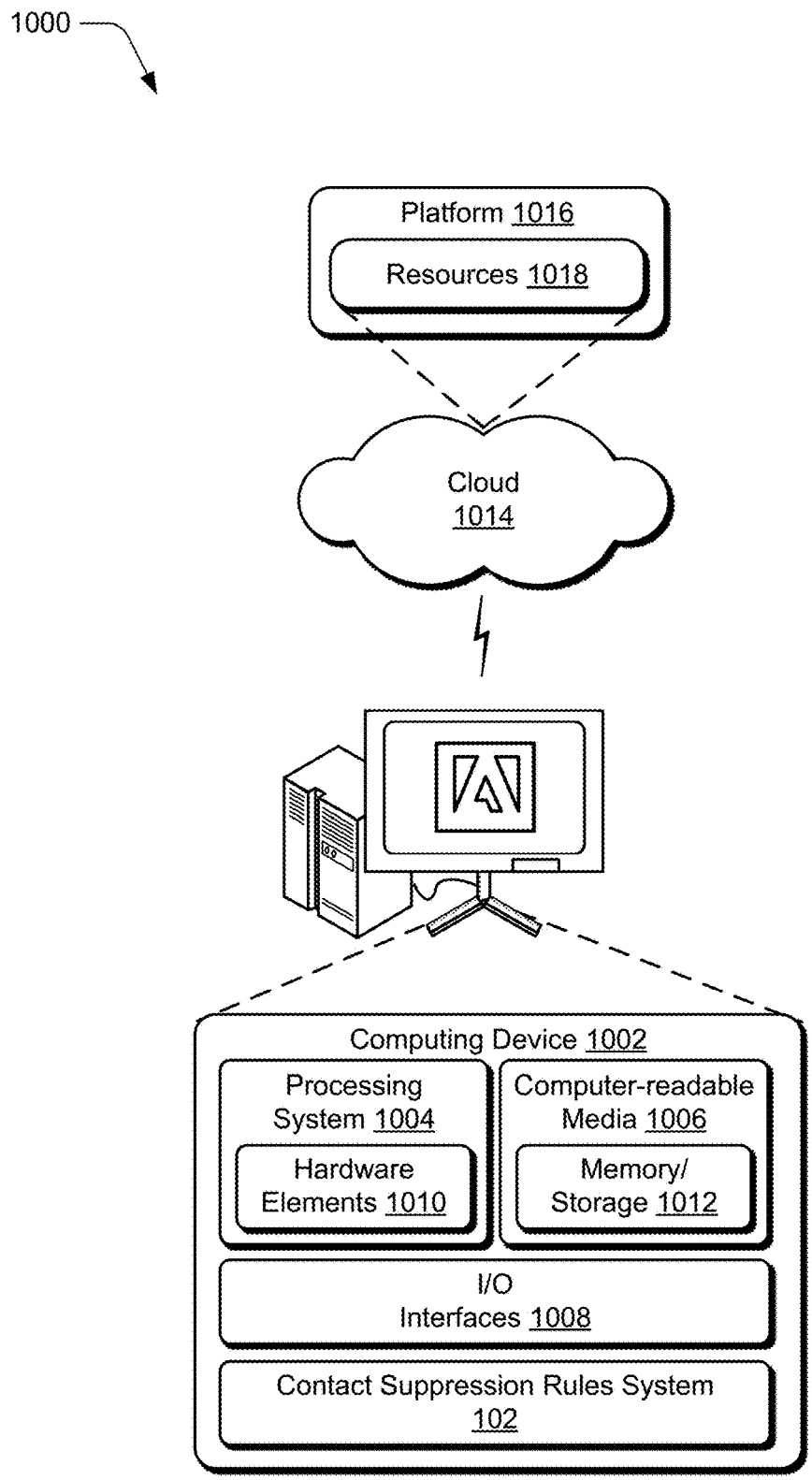
FIG. 10 illustrates an example system including various components of an example device that can be implemented as any type of computing device as described and/or utilized with reference to FIGS. 1-9 to implement embodiments of the techniques described herein.

The contact management suppression rules system 102 is illustrated as including a suppression rules manager 108, which may be implemented locally and/or "over the cloud" as shown in FIG. 10. Generally, suppression rules manager 108 represents functionality to manage suppression rules 110 for the enterprise. As described throughout, suppression rules 110 include logic in the form of executable scripts to prevent communication of marketing contact to contacts that satisfy certain parameters of the suppression rules 110. The suppression rules 110 are dynamically applied by the suppression rules manager 108 to contact data 112 of the enterprise to generate suppression lists 114. The contact data 112, for example, may include contact information, such as names, email addresses, social media identities, and so forth, for the enterprise's contacts, as well as various characteristics of each contact. The contact data 112 may also include different types of data regarding a contacts behavior with the enterprise including, by way of example and not limitation, contact actions (e.g., purchase, downloads, subscription sign-ups, account sign-ups, or first time launches of a software application), a date of the contact action (e.g., a date that a product was purchased or downloaded by the contact), an identifier of the product or service associated with the contact action (e.g., an identifier of a physical product, software service, or application), a type of the product or service associated with the contact action (e.g., a software application, a physical product, or an online service), a type of the contact (e.g., a user that previously purchased a product or service, a user on a trial account or free account, or a potential customer), a type of the contact's subscription (e.g., pro-subscription or standard subscription), as well as contact information for the contact across different communication channels (e.g., email address, social media username, or account identifier).

The contact data 112 is usable to communicate marketing content to contacts via a variety of different communication channels, such as email, social networking, in-product push notifications, and so forth. However, when the suppression rules 110 are applied to the contact data 112, the resulting suppression lists 114 include various subsets of the contacts of the contact data 112 which are prevented from receiving marketing content. The suppression rules manager 108 stores the contact data 112, the suppression rules 110, and the suppression lists 114 in a centralized enterprise database 116. Thus, unlike conventional systems in which suppression rules of an enterprise are stored across multiple different data sources, the centralized enterprise database 116 enables storage in a centralized location. The centralized enterprise database 116 may be implemented in a variety of different ways, but in some cases is implemented as a single contact management suppression rules (CMSR) Hive table.

The system 102 is further implemented as including a marketing communication manager 118. Generally, the marketing communication manager 118 represents functionality to communicate campaigns 120 containing various marketing content 122 to contacts via various communication channels 124. The marketing campaigns 120 may be communicated as part of an overall marketing strategy utilized by the enterprise to increase awareness of a good or service. This may include making contacts aware of the good or service as well as making the contacts aware of characteristics of the good or service, even if the contact already owns the good. An advertiser, for instance, may form a marketing strategy to communicate functionality available from the product or service to increase usage and customer satisfaction. As part of this, the marketing communication manager 118 accesses the suppression lists 114 stored in the centralized enterprise database 116 and prevents communication of the marketing content 122 to contacts included in the suppression lists 114. In other words, the suppression lists prevents communication of marketing content 122 to contacts that would have otherwise received the marketing content 122 if not for the suppression rules 110. The marketing communication manager 118 may be implemented using a variety of different technologies, such as Hadoop and functionalities such as Oozie to schedule marketing communications and communicate marketing content.

Suppression rules manager 108 provides access to the various suppression rules for the enterprise via a graphical user interface 126. The graphical user interface 126 may be hosted on an enterprise server behind a firewall, such as an Apache server. In environment 100, the graphical user interface 126 is depicted as being displayed on each of enterprise devices 104 to enable authenticated users 128 of the enterprise to create suppression rules 110, as well as to view and/or modify existing suppression rules 110. The contact management suppression rules system 102 is scalable to enable the users 128 to create new suppression rules 110, which are then stored in the centralized enterprise database 116. The users 128 may correspond to users of the enterprise positioned all around the world that each can access the single centralized contact rules suppression system 102 using an enterprise device. In some cases, different geographic locations may have different suppression rules. The contact management suppression rules system 102 maintains the suppression rules such that they are global in nature, yet at the same time the suppression rules can be filtered for viewing to see rules associated with specific geographic locations. The contact management suppression rules system 102 enables the users to download suppression rule data (such as the number of suppressed users) for different geographic locations. In this way, the system enables comparison of number of suppressed users across different geographic locations.

Unlike conventional systems which make it difficult to view suppression rules, the suppression rules manager 108 controls the graphical user interface 126 to display a real-time listing of the suppression rules 110 for the enterprise along with characteristics and parameters of the suppression rules 110, such as a length of the suppression rule, a state of the suppression rule (e.g., suppression rule enabled or disabled), a date of the last change to the suppression rule, and comments regarding the change to the suppression rule.

Moreover, the graphical user interface 126 enables authenticated users of the enterprise to modify the characteristics of the suppression rules 110, such as modifying a length associated with a suppression rule 110 or changing the state of the suppression rule 110 by toggling the suppression rule 110 on or off. In some cases, the suppression rules manager 108 requires the user to provide comments regarding the reasons for the change to the suppression rule 110 in order for the suppression rule change to take effect. The modified parameters of the suppression rule 110 are then stored in the database 116 along with the user-provided reasons for the modification and the date of the modification. The suppression rules manager 108 may also automatically communicate a notification to users, such as by automatically transmitting an email identifying the suppression rule modification, an identify of the user that initiated the modification, and the user-provided reasons for the modification.

In some cases, the suppression rules manager 108 provides varying levels of access to the suppression rules 110 via the graphical user interface 126 based on user credentials of the users 128 of the enterprise. By way of example, the suppression rules manager 108 may provide read and write access to users 128 with administrator credentials, while permitting read-only access to other users 128. In this way, the contact management suppression rules system 114 can control access to the suppression rules 110 at varying levels of granularity.

The contract suppression rules manager 108 is further depicted as including a suggestion engine 130. Generally, the suggestion engine 130 represents functionality to apply a machine learning model to user interaction data with marketing content 122 to form suppression rule modification suggestions. Such suggestions, for example, may include a recommendation to modify the length parameter of a suppression rule to a different value or a suggestion to enable or disable a suppression rule 110. These recommendations may be surfaced in the graphical user interface 126 for approval by a designated user (e.g., a marketing manager), or in some instances may be automatically applied such that the suppression rule parameters and characteristics change dynamically based on the user interaction data.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data (e.g., user interactions with marketing content) by analyzing the known data to learn to generate outputs that reflect patterns and attributes of the known data. According to various implementations, such a machine-learning model uses supervised learning, semi-supervised learning, unsupervised learning, or reinforcement learning. For example, the machine-learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. Thus, a machine-learning model makes high-level abstractions in data by generating data-driven predictions or decisions from the known input data. Notably, the contact management suppression rules system 102 can be easily integrated to other systems and data sources in a marketing pipeline of the enterprise via API calls. Thus the contact management suppression rules system 102 can obtain and communicate data effortlessly between various different systems and data sources.

Having considered an example environment, consider now a discussion of some example details of the techniques for a contact management suppression rules system in accordance with one or more implementations.

Figure 2:
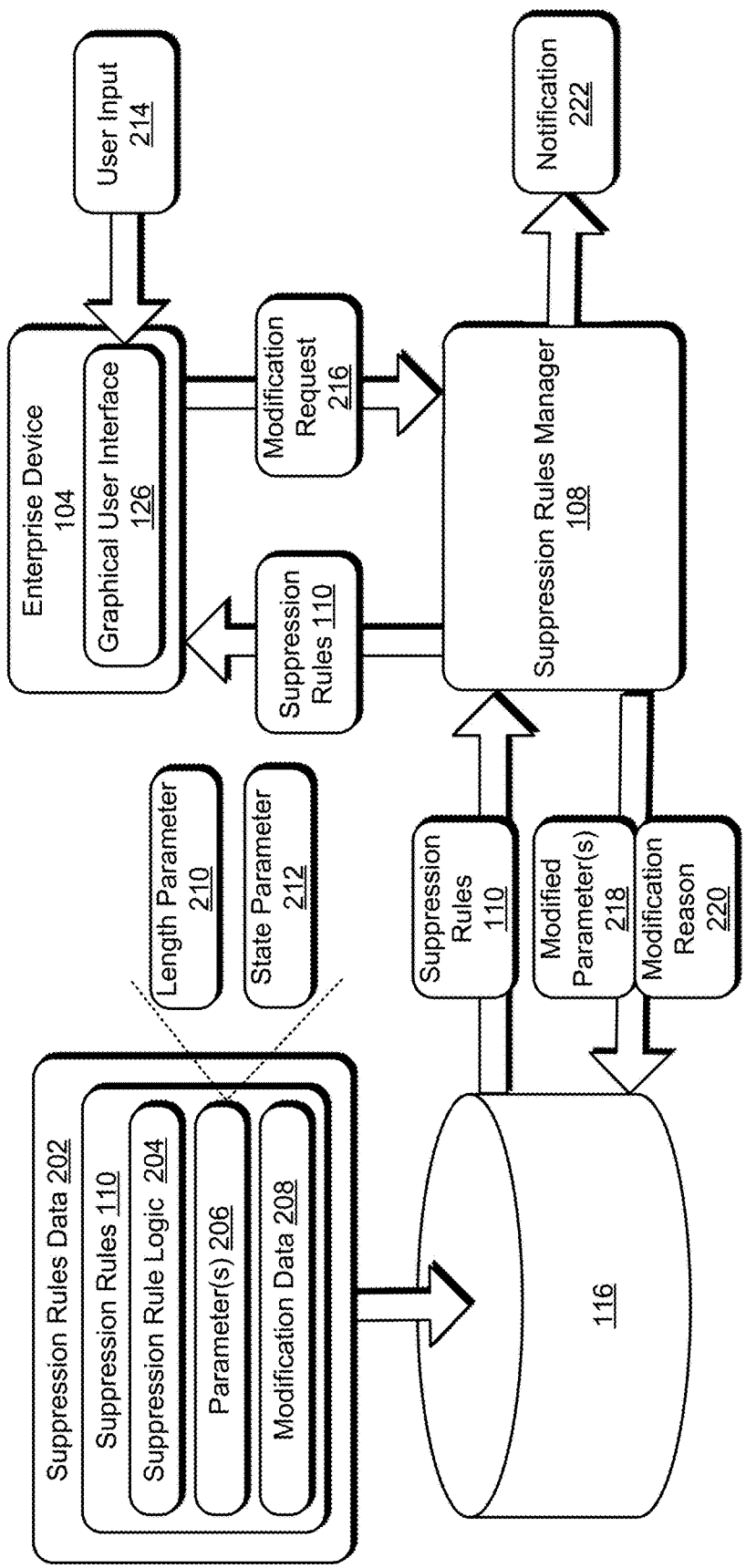
FIG. 2 depicts an example implementation in which the contact management suppression rules system of FIG. 1 maintains suppression rules data and outputs a graphical user interface based on the suppression rules data.

FIG. 2 depicts an example implementation 200 in which the contact management suppression rules system 102 of FIG. 1 maintains suppression rules data and outputs a graphical user interface based on the suppression rules data. The illustrated example 200 includes from FIG. 1 the suppression rules manager 108, the graphical user interface 126, and the centralized enterprise database 116 of the contact management suppression rules system 102

In example 100, suppression rules data 202 is generated to describe various characteristics and parameters for each suppression rule 110. In this example, the suppression rules data 202 includes, for each suppression rule, suppression rule logic 204, parameters 206, and modification data 208. The suppression rule logic 204 corresponds to the executable script or code of the suppression rule 110. The parameters 206 correspond to parameters of the suppression rule 110 and are depicted as including a length parameter 210 corresponding to a length of the suppression rule 110 and a state parameter 212 corresponding to a current state of the suppression rule 110 (e.g., enabled or disabled). However, the parameters 206 may include a variety of different parameters of the suppression rules 110 without departing from the spirit or scope of the techniques described herein. The modification data 208 describes a history of user modifications to the suppression rule 110. The modification data 208, for example, may identify a date of each modification to the suppression rule 110 as well as user-provided comments regarding reasons for each change to the suppression rule 110. The suppression rules data 202 is stored by the contact management suppression rules system 102 in the centralized enterprise database 116.

The suppression rules data 202 maintained in the centralized enterprise database 116 is accessible to users of the enterprise on enterprise devices 104 via the graphical user interface 126. In example 200, the suppression rules manager 108 obtains the suppression rules 110 from the centralized enterprise database 116 and controls the graphical user interface 126 to display a real-time listing of the suppression rules 110 on an enterprise device 104. The graphical user interface 126 may also display other suppression rules data 202 along with the listing of the suppression rules 110, such as the parameters 206 and the modification data 208. For example, the graphical user interface 126 can be controlled to display the suppression rule 110, as well as a length of the suppression rule 110 based on the length parameter 210, a state of the suppression rule 110 based on the state parameter 212, and a date of the last modification to the suppression rule 110 based on the modification data 208. Indeed, the graphical user interface 126 may be configured in a variety of different ways to display a variety of different parameters and characteristics of the suppression rules 110 without departing from the spirit or scope of the described techniques.

The suppression rules manager 108 enables authenticated users of the enterprise to modify the suppression rules data 202 via various graphical controls and functionalities of the graphical user interface 126, such as the graphical user interface similar to the ones discussed in relation to FIGS. 4-7. In example 200, the graphical user interface 126 is depicted as obtaining user input 214 to modify a parameter 206 of the suppression rules 110. For example, the user input may be received via a graphical control of the graphical user interface 126 to modify the length parameter 210 or to modify the state parameter 212, such as by toggling the suppression rule 110 on or off. The suppression rule manager 108 obtains a modification request 216 to modify the parameter 206 of the suppression rule 110 based on the user input 214 and updates the suppression rules 110 stored in the centralized enterprise database 116 with the modified parameter 218 of the suppression rule 110.

In some instances, the suppression rules manager 108 is configured to require the user to provide a reason for the modification request in order for the modification to take effect. As such, the modification request 216 may include a modification reason 220 for the modification to the modified length parameter 210. The suppression rules manager 108 logs the modification reason 220 in the centralized enterprise database along with the modified parameters 218.

The suppression rules manager 108 is further implemented to generate a notification 222 that describes the suppression rule modification. The notification 222, for example, may contain information identifying the modified parameters 218 of the suppression rule 110, an identity of the user that initiated the modification request 216, and the modification reasons 220 provided by the user. The notification 222 is automatically communicated by the suppression rules manager 108 to interested users over the network, such as by sending an email notification to users who are authorized to receive suppression rule updates. In this way, authorized users of the enterprise are notified in real-time when a modification is made to a global suppression rule. Doing so further increases the transparency of the suppression rules across authorized users of the enterprise, while also giving such users the chance to voice complaints to suppression rule modifications which appear inconsistent with the objectives of the enterprise.

The described techniques also involve using the suppression rules data 202 to prevent suppressed contacts from receiving marketing content from the organization. In this context, consider FIG. 3.

Figure 3:
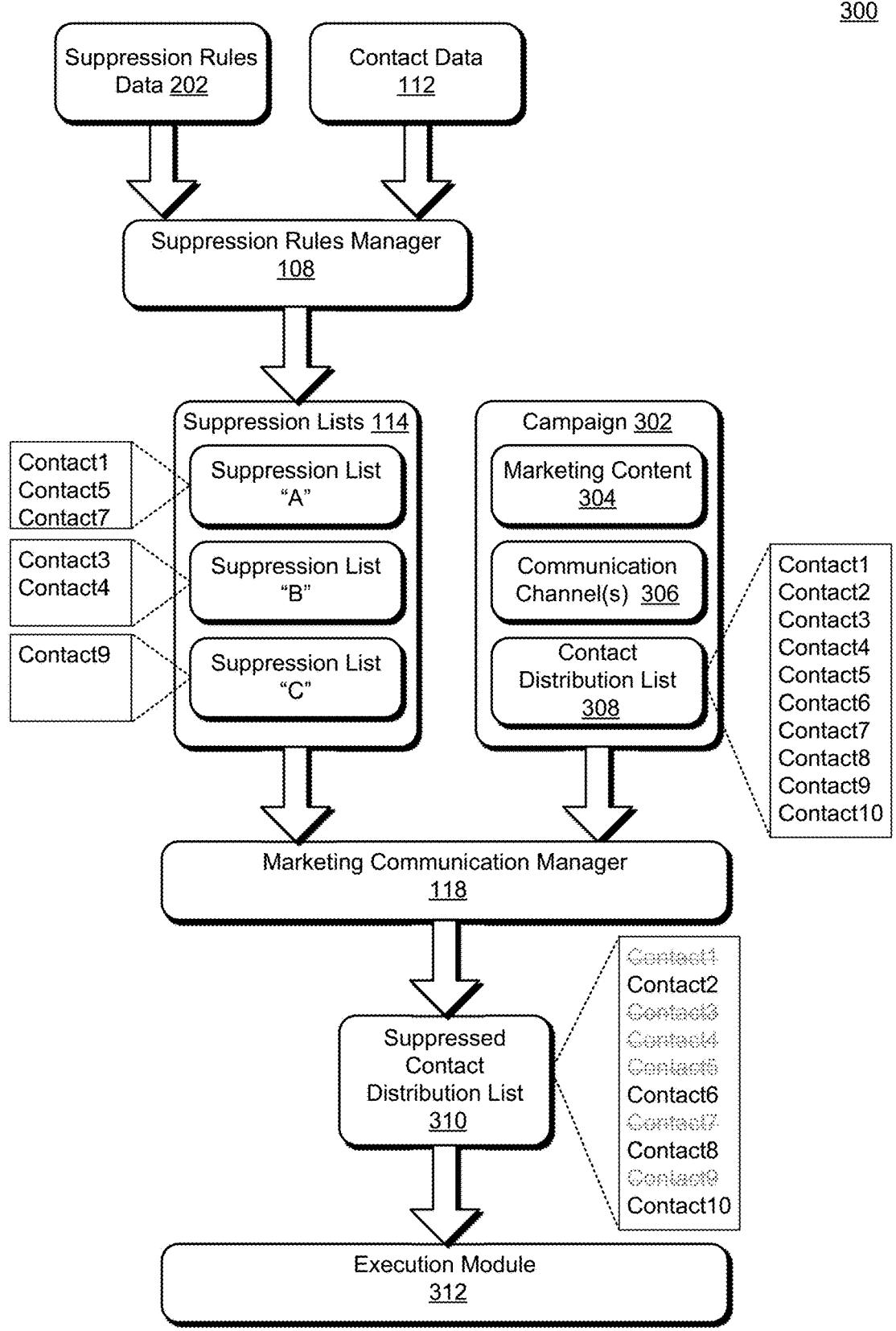
FIG. 3 depicts an example implementation in which the contact management suppression rules system of FIG. 1 generates a suppressed contact list for a campaign.

FIG. 3 depicts an example implementation 300 in which the contact management suppression rules system 102 of FIG. 1 generates a suppressed contact list for a campaign. The illustrated example 300 includes from FIG. 1 the suppression rules manager 108 and the marketing communication manager 118.

In example 300, the marketing communication manager 118 is configured to schedule communication of a campaign 302. The campaign 302 includes data in the form of marketing content 304, communication channels 306, and a contact distribution list 308. The marketing content 304 may correspond to any type of graphical, textual, and/or video content that is to be distributed to users as part of the campaign 302, such as promotional videos, social media "posts", email messages, and so forth. The communication channels 306 of the campaign 302 define the channels of communication for the marketing content 304, such as email, social networks, video sharing sites, and so forth. In some cases, the campaign 302 may include different types of marketing content 304 for different communication channels 306. For example, the marketing content may include an email to be communicated via email to users, a video to be posted on a video sharing system (e.g., YouTube®), and an image to be posted on one or more social networking systems (e.g., Facebook®, Instagram®, or Twitter®).

The contact distribution list 308 includes identifiers or addresses for an intended distribution list of contacts of the organization which are to receive the marketing content, such as email addresses, social network identities, and so forth. In some cases, the contact distribution list 308 may be specifically configured for the particular campaign 302, such as a list of contacts that have subscribed to receive marketing content and updates from the enterprise. Alternately, the contact distribution list 308 may correspond to a complete list of the contacts of the enterprise. In this example, contact distribution list 308 is depicted as including contact1, contact2, contact3, contact4, contacts, contact6, contact7, contact8, contact9, and contact10.

Regardless of how the contact distribution list is obtained, enterprises would like to suppress certain contacts from receiving marketing content for a variety of different reasons as discussed throughout. To do so, the marketing communication manager 118 leverages the suppression rules 110 to suppress certain contacts in the contact distribution list from receiving the marketing content 304 by applying the suppression rules data 202 stored in the centralized enterprise database 116 to the contact data 112 to generate suppression lists 114. Each suppression list 114 includes a list of contacts who are prevented from receiving marketing content 304 due to a suppression rule 110. In this example, the suppression lists 114 are depicted as including a suppression List "A" listing Contact1, Contact5, and Contact7, a Suppression List "B" listing Contact3 and Contact4, and a Suppression List "C" listing Contact9.

The marketing communication manager 118 accesses the suppression lists 114 and prevents communication of the marketing content 304 to contacts included in the suppression lists 114. To do so, the marketing communication manager 118 generates a suppressed contact distribution list 310 for the campaign 302. The suppressed contact distribution list 310 includes a list of the contacts included in contact distribution list 308 who are not listed on any of the suppression lists 114. In other words, the marketing communication manager 118 removes those contacts listed in the suppression lists 114 from the contact distribution list 308 of the campaign in order to generate the suppressed contact distribution list 310. In this example, the marketing communication manager 118 generates the suppressed contact distribution list 310 by removing the contacts listed in any of Suppression Lists A, B, or C from the contacts listed in the contact distribution list 308. Doing so causes the suppressed contact distribution list 316 to include Contact2, Contact6, Contact8, and Contact10. The marketing communication manager 118 then provides the suppressed contact distribution list 310, along with the marketing content 304, to an execution module 312 which communicates the marketing content to the contacts of the suppressed contact list 310 via the respective communication channels 306.

Notably, the suppressed contact Lists A, B, and C may be generated from suppression rules 110 obtained from a variety of disparate sources across the enterprise. Thus, by storing these rules in a single centralized enterprise database 116, the enterprise ensures that all of the contacts that should be suppressed from receiving marketing content for various reasons are in fact suppressed.

Figure 4:
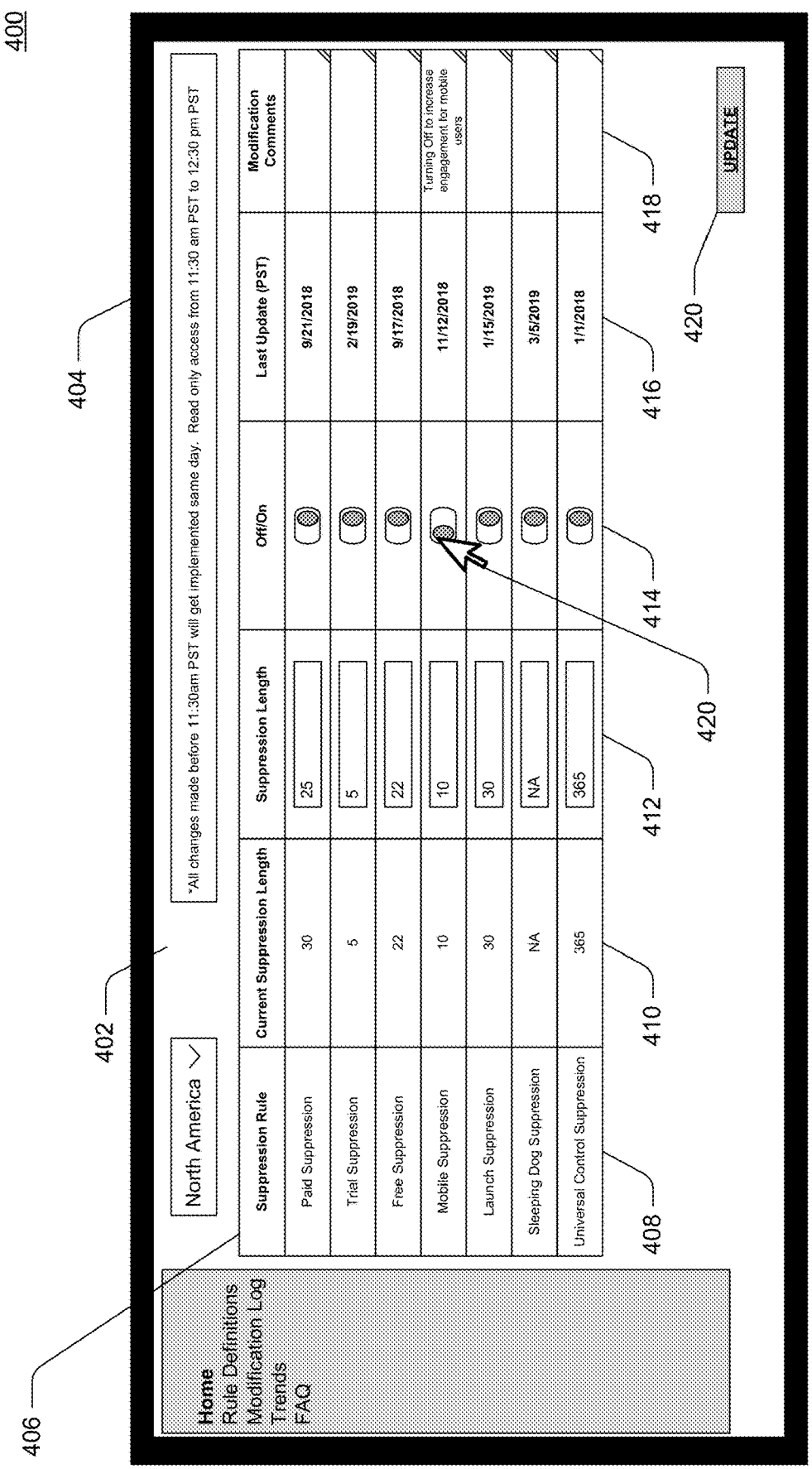
FIG. 4 depicts an example of the graphical user interface of the contact management suppression rules system.

FIG. 4 depicts an example 400 of the graphical user interface 126 of contact management suppression rules system 102.

The illustrated example 400 includes a graphical user interface 402 displayed via a display device 404. The graphical user interface 402 is depicted as including a real-time suppression rules listing 406 that includes a real-time listing of the suppression rules 110 of the enterprise arranged in a table format. The suppression rule listing 406 includes a first column that lists suppression rules 408, and for each suppression rule, a current suppression length 410, a suppression length control 412, a state control 414, a modification date 416, and a modification reason control 418. Thus, the suppression rule listing 406 enables users of the enterprise to view all of the existing suppression rules 110 for the enterprise, along with various parameters and characteristics of the suppression rules 110, such as the length and state of each suppression rule 110.

In this example, the suppression rule listing 406 includes the following suppression rules: a paid suppression rule, a trial suppression rule, a free suppression rule, a mobile suppression rule, a launch suppression rule, a "sleeping dog" suppression rule, and a "universal control" suppression rule. Notably, the suppression rules listed in example 400 are just a few examples of the types of suppression rules which can be created, managed, and modified using the described techniques. The graphical user interface 126 may be further implemented to display a suppression rule definition for each suppression rule to enable users of the enterprise to view a definition of each suppression rule 110.

Consider, for example, FIG. 5 which depicts an example 500 of the graphical user interface 126 of contact management suppression rules system 102 displaying suppression rule definitions. The illustrated example 500 includes a graphical user interface 502 displayed via a display device 504. The graphical user interface 502 displays suppression rule definitions, which in this example include the following suppression rules and definitions:

A paid suppression rule which suppresses contacts for a period of X days from the purchase of a particular product, subscription, or service.

A trial suppression rule which suppresses contacts who have signed up for a trial subscription for a period of X days from the end of the trial period.

A free suppression rule that suppresses contacts who have signed up for a free account for a period of X days from the date that the contact signed up for the free account.

A mobile suppression rule that suppresses contacts who downloaded mobile apps of the enterprise for X days from the date that the contact downloaded the mobile app.

A launch suppression rule that suppresses contacts who have launched a particular software application for X days from the date of the launch.

A "sleeping dog" suppression rule that suppresses contacts with a high propensity to opt out from receiving marketing content for a period of X days.

A "universal control" suppression rule that suppresses a certain number of contacts in a "holdout group" from receiving any type of marketing content for X days. This rule is usable by the enterprise to compare user interactions by the contacts in the holdout group to users that are not suppressed from receiving marketing content in order to gauge the effectiveness of various marketing campaigns.

For each of the listed suppression rule definitions, the variable "X" corresponds to the length parameter, which can be modified via the graphical user interface via the suppression length control 412. Notably, the suppression rules 110 may include various other parameters which may also be surfaced in the graphical user interface for modification. For example, some suppression rules may be associated with a particular product or service which may be modified via the graphical user interface to include different products or services. As another example, the suppression rules may define a particular type of contacts, such as contacts that have purchased a service, in which case this type of contact may be modified via the graphical user interface. Notably, there are a variety of different ways in which different suppression rule parameters may be surfaced and modified via the graphical user interface 126.

Returning to example 400, note that the suppression rules may be associated with different products of an enterprise. For example, a first paid suppression rule can be created for a first product, and a second suppression rule can be created for a second product. Moreover, some suppression rules may not have an associated length parameter. For example, in example 400, the sleeping dog suppression rule is depicted without a length parameter which indicates that this suppression rule is applied indefinitely. Thus, the suppression rules can be created for a variety of different contacts, products, product types, contact actions, and contact characteristics without departing from the spirit or scope of the described techniques.

The illustrated example 400 also includes a cursor 420, which represents functionality to enable a user to provide input to modify one of the suppression rules 408 listed in the graphical user interface 402. For example, the user can select the suppression length control 412 using the cursor and then type in a new suppression rule length for the respective suppression rule. In example 400, the user has typed in a new suppression rule length of 25 days into the suppression length control 412 for the Paid Suppression rule. Additionally, the user has clicked the state control 414, using the cursor 520, to toggle the Mobile Suppression rule from on to off. Additionally, the user has provided reasons for modifying the mobile suppression rule into the modification comments control 518, which in this example state "turning off to increase engagement for mobile users". Now, when the user selects the update control 420, the modifications made to the suppression rules are automatically applied to the respective suppression rules 110 stored in the centralized enterprise database 116.

In some cases, the contact suppression rule system 102 batches the updating of the suppression rules 110 based on the user modification. For example, the modification may be applied by the system at a specific time each day. In example 400, the graphical user interface 402 indicates that "all changes made before 11:30 am PST will get implemented the same day" and that there is "Read-only access from 11:30 am PST to 12:30 pm PST" to enable the changes to the suppression rules made via the graphical user interface to be applied by the suppression rules manager 108. In this way, the suppression rule system 102 can batch the updates to occur once per day, or at some other agreed upon time period.

Figure 6:
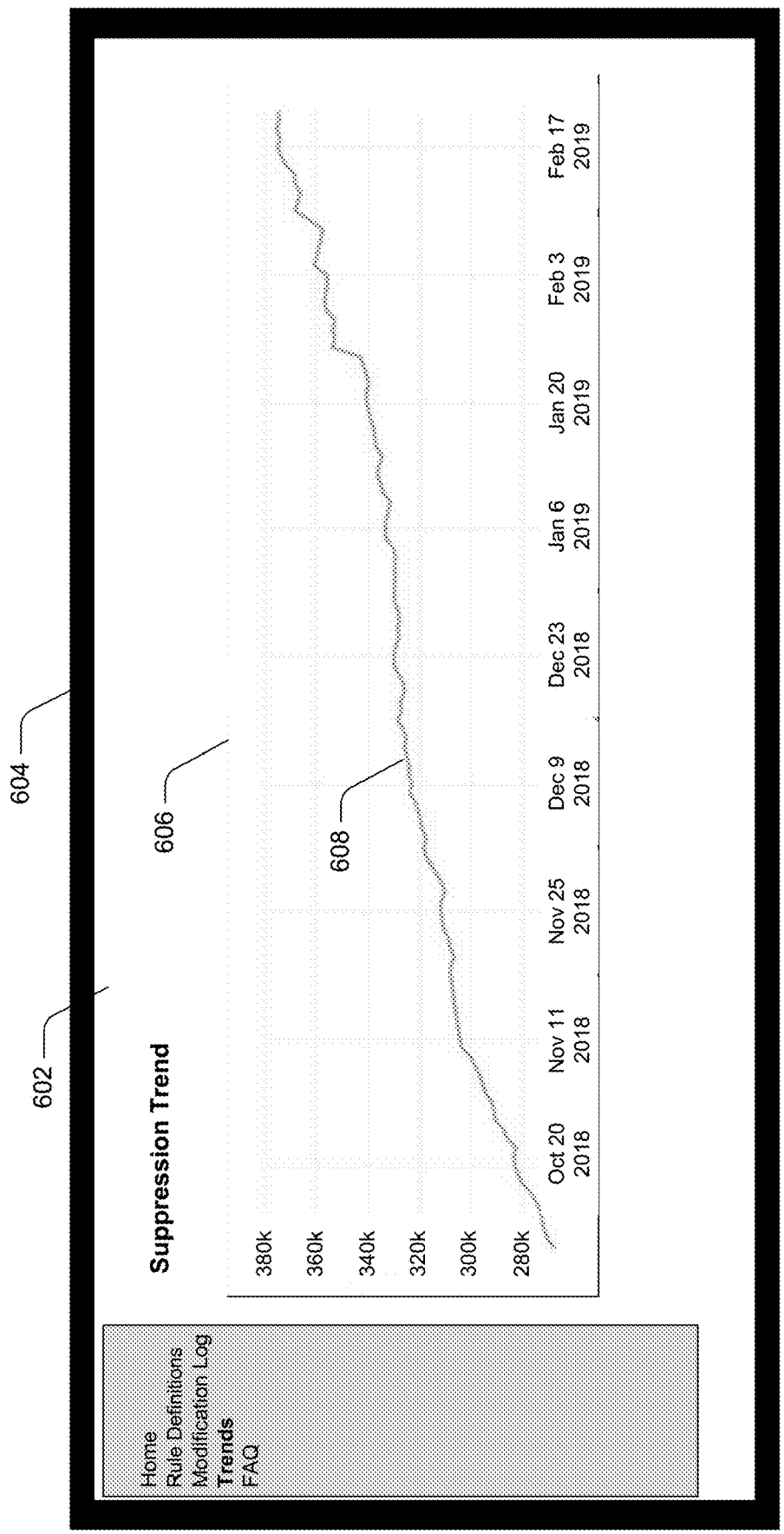
FIG. 6 depicts an example of the graphical user interface of contact management suppression rules system displaying a suppression trend graph.

FIG. 6 depicts an example 600 of the graphical user interface 126 of contact management suppression rules system 102 displaying a suppression trend graph. The illustrated example 600 includes a graphical user interface 602 displayed via a display device 604. The graphical user interface 602 displays a suppression trend graph 606 which includes a suppression trend line 608. The suppression trend line 608 graphs the number of suppressed contacts over time. In this example, the suppression trend line 608 illustrates the number of suppressed contacts of the enterprise has increased over time from approximately 280,000 suppressed contacts in October of 2018 to approximately 380,000 suppressed contacts in February of 2019. The suppression trend line 608 enables users of the enterprise to see a snapshot of the effect the suppression rules 110 are having on the contacts that are suppressed globally over time. In this way, adjustments can be made via the graphical user interface 126 in the event that too many or too few contacts are being suppressed over time.

FIG. 7 depicts an example 700 of the graphical user interface 126 of contact management suppression rules system 102 displaying suppression rule suggestions. The illustrated example 700 includes a graphical user interface 702 displayed via a display device 704. In this example, graphical user interface 702 displays suggestion rule suggestions 706 and 708. The suggestion rule suggestions are generated by suggestion engine 130 by applying a machine learning model to user interaction data with marketing content 122. In this example, suppression rule suggestions 706 correspond to suggested modifications to the length parameter of the suggestion rules 110, which suppression rule suggestions 708 correspond to suggested modifications to the state parameter of the suppression rules 110. The suggestions 706, for example, include a suggestion to change the paid suppression rule from a length of 30 days to a length of 25 days, a suggestion to change the trial suppression rule from 5 days to 10 days, a suggestion to change the free suppression rule from 22 days to 10 days, and so on. Similarly, the suggestions 708 include a suggestion to toggle the trial suppression rule from "on" to "off" as well as a suggestion to toggle the mobile suppression rule from "off" to "on". The suggestions 706 and 708 are surfaced in the graphical user interface 702 for approval by a designated user (e.g., a marketing manager). For example, the user may be able to click the suggestion length or state parameters in order to modify the parameter to the suggested parameter. Alternately, in some instances, the suggestions may be automatically applied such that the suppression rule parameters and characteristics change dynamically based on the user interaction data.

Having discussed example details of the techniques for a voice interaction development tool, consider now some example procedures to illustrate additional aspects of the techniques.

Example Procedures

This section describes example procedures for a contact management suppression rules system in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 8:
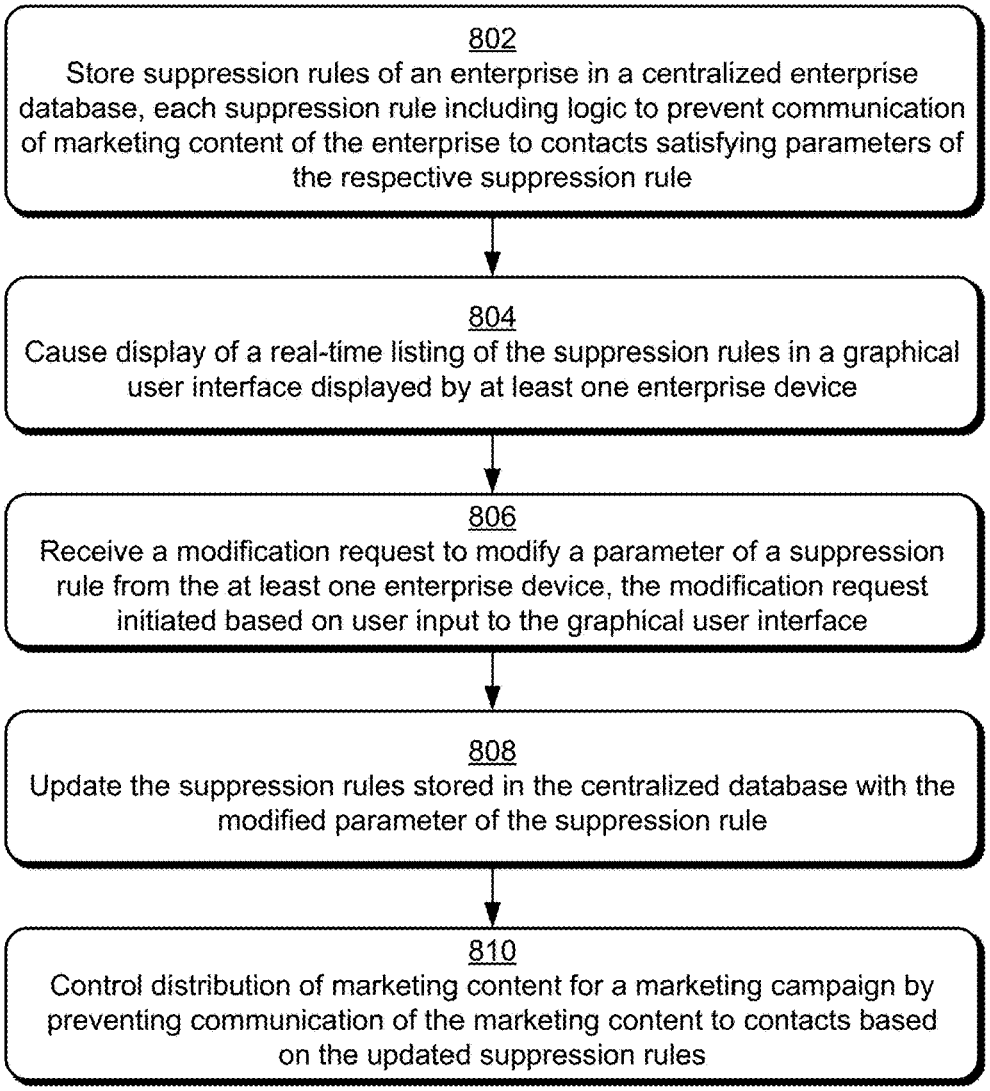
FIG. 8 depicts an example procedure in which distribution of marketing content is controlled using suppression rules of an enterprise.

FIG. 8 depicts an example procedure 800 in which distribution of marketing content is controlled using suppression rules of an enterprise.

Suppression rules of an enterprise are stored in a centralized enterprise database (block 802). In accordance with the principles discussed herein, each suppression rule includes logic to prevent communication of marketing content to contacts satisfying a parameter of the respective suppression rule. By way of example, the suppression rules 110 are stored by the contact management suppression rules system 102 in the centralized enterprise database 116. Unlike conventional systems in which suppression rules of an organization may be stored across multiple data sources, the centralized enterprise database 116 enables storage in a centralized location. The centralized enterprise database 116 may be implemented in a variety of different ways, but in some cases is implemented as a single CMSR Hive table.

A real-time listing of the suppression rules is displayed in a graphical user interface displayed by at least one enterprise device (block 804). By way of example, the suppression rules manager 108 obtains the suppression rules 110 from the centralized enterprise database 116 and controls the graphical user interface 126 to display a real-time listing of the suppression rules 110 on an enterprise device 104. The graphical user interface 126 may also display other suppression rules data 202 along with the listing of the suppression rules 110, such as the parameters 206 and the modification data 208. For example, the graphical user interface 126 can be controlled to display the suppression rule 110, as well as a length of the suppression rule 110 based on the length parameter 210, a state of the suppression rule 110 based on the state parameter 212, and a date of the last modification to the suppression rule 110 based on the modification data 208. Indeed, the graphical user interface 126 may be configured in a variety of different ways to display a variety of different parameters and characteristics of the suppression rules 110 without departing from the spirit or scope of the described techniques.

A modification request to modify a parameter of a suppression rule is received from the at least one enterprise device (block 806), and the suppression rules stored in the centralized enterprise database are updated with the modified parameter of the suppression rule (block 808). In accordance with the principles discussed herein, the modification request is initiated based on user input to the graphical user interface. By way of example, the suppression rules manager 108 enables authenticated users of the enterprise to modify the suppression rules data 202 via various graphical controls and functionalities of the graphical user interface 126. The graphical user interface 126 obtains user input 214 to modify a parameter 206 of the suppression rules 110. For example, the user input may be received via a graphical control of the graphical user interface 126 to modify the length parameter 210 or to modify the state parameter 212, such as by toggling the suppression rule 110 on or off. The suppression rule manager 108 obtains a modification request 216 to modify the parameter 206 of the suppression rule 110 based on the user input 214, and updates the suppression rules 110 stored in the centralized enterprise database 116 with the modified parameter 218 of the suppression rule 110.

Distribution of marketing content for a marketing campaign is controlled by preventing communication of the marketing content to certain contacts based on the updated suppression rules (block 810). For example, the marketing communication manager 118 is configured to schedule communication of a campaign 302. The campaign 302 includes data in the form of marketing content 304, communication channels 306, and a contact distribution list 308. The marketing content 304 may correspond to any type of graphical, textual, and/or video content that is to be distributed to users as part of the campaign 302, such as promotional videos, social media "posts", email messages, and so forth. The communication channels 306 of the campaign 302 define the channels of communication for the marketing content 304, such as email, social networks, video sharing sites, and so forth. In some cases, the campaign 302 may include different types of marketing content 304 for different communication channels 306. For example, the marketing content may include an email to be communicated via email to users, a video to be posted on a video sharing system (e.g., YouTube®), and an image to be posted on one or more social networking systems (e.g., Facebook®, Instagram®, or Twitter®).

The contact distribution list 308 includes identifiers or addresses for a list of contacts of the organization, such as email addresses, social network identities, and so forth. In some cases, the contact distribution list 308 may be configured for the particular campaign 302, such as a list of contacts that have subscribed to received marketing content. Alternately, the contact list may include a complete list of the contacts in the organizations contact database. In this example, contact distribution list 308 is depicted as including contact1, contact2, contact3, contact4, contacts, contact6, contact7, contact8, contact9, and contact10.

Regardless of how the contact list is obtained, enterprises would like to suppress certain contacts from receiving marketing content for a variety of different reasons as discussed throughout. To do so, the marketing communication manager 118 leverages the suppression rules 110 to suppress certain contacts in the contact list from receiving the marketing content 304 by applying the suppression rules data 202 stored in the centralized enterprise database 116 to the contact data 112 to generate suppression lists 114. Each suppression list 114 includes a list of contacts who are prevented from receiving marketing content 304 due to a suppression rule 110. In this example, the suppression lists 114 are depicted as including a suppression List "A" listing Contact1, Contact5, and Contact7, a Suppression List "B" listing Contact3 and Contact4, and a Suppression List "C" listing Contact9.

The marketing communication manager 108 accesses the suppression lists 114 and prevents communication of the marketing content 304 to contacts included in the suppression lists 114. To do so, the marketing communication manager 118 generates a suppressed contact distribution list 310 for the campaign 302. The suppressed contact distribution list 310 includes a list of the contacts included in contact distribution list 308 who are not listed on any of the suppression lists 114. In other words, the marketing communication manager 118 removes those contacts listed in the suppression lists 114 from the contact distribution list 308 of the campaign in order to generate the suppressed contact distribution list 310. In this example, the marketing communication manager 118 generates the suppressed contact distribution list 310 by removing the contacts occurring on any of Suppression Lists A, B, or C from the contacts occurring in the contact distribution list 308. Doing so causes the suppressed contact list 316 to include Contact2, Contact6, Contact8, and Contact10. The marketing communication manager 118 then passes the suppressed contact distribution list 310, along with the marketing content 304, to an execution module 312 which communicates the marketing content to the contacts of the suppressed contact distribution list 310 via the respective communication channels 306.

Notably, the suppressed contact Lists A, B, and C may be generated from suppression rules 110 obtained from a variety of disparate sources across the organization. Thus, by storing these rules in a single centralized enterprise database, the organization ensures that all contacts that should be suppressed for various reasons are in fact suppressed from receiving various forms of marketing content of the campaign from the enterprise.

Figure 9:
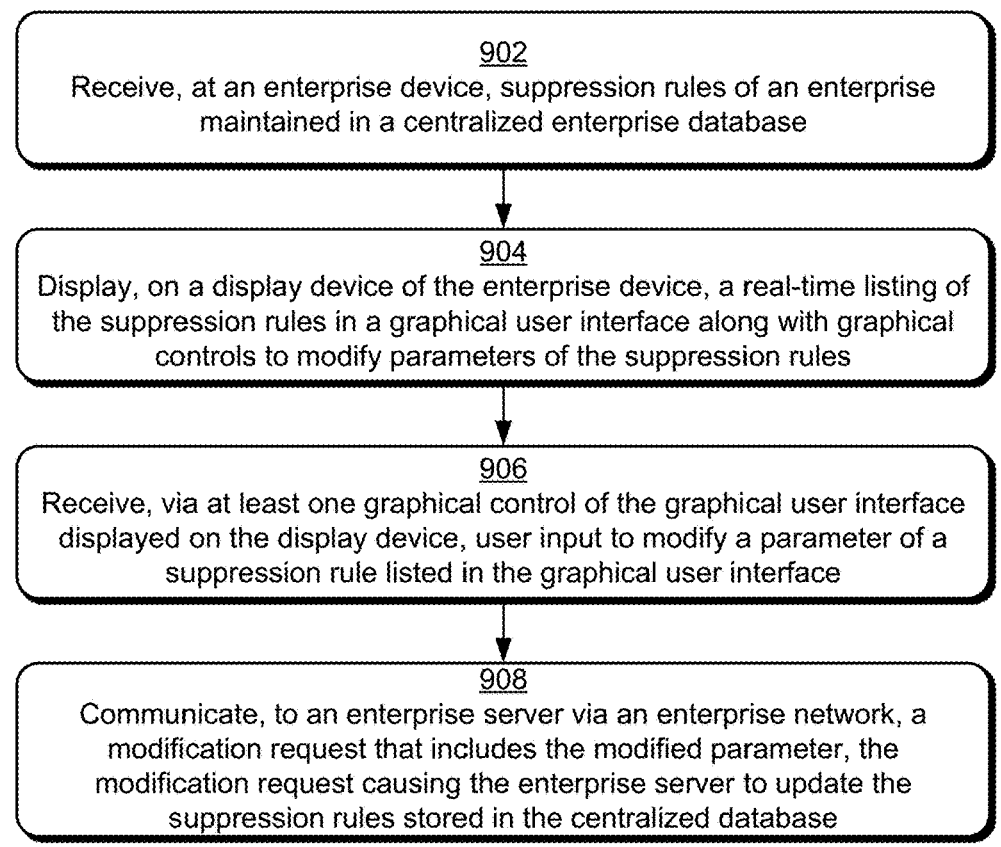
FIG. 9 depicts an example procedure in which suppression rules of an enterprise are modified using a graphical user interface provided by a contact management suppression rules system

FIG. 9 depicts an example procedure 900 in which suppression rules of an enterprise are modified using a graphical user interface provided by a contact management suppression rules system.

Suppression rules of an enterprise maintained in a centralized enterprise database are received at an enterprise device (block 902). By way of example, suppression rules 110 of an enterprise maintained in a centralized enterprise database 116 are received at an enterprise device 104. In accordance with the principles discussed herein, each suppression rule includes logic to prevent communication of marketing content to contacts satisfying a parameter of the respective suppression rule. Unlike conventional systems in which suppression rules of an enterprise may be stored across multiple data sources, the centralized enterprise database 116 enables storage in a centralized location. The centralized enterprise database 116 may be implemented in a variety of different ways, but in some cases is implemented as a single CMSR Hive table.

A real-time listing of the suppression rules is displayed in a graphical user interface along with graphical controls to modify parameters of the suppression rules on a display device of the enterprise device (block 904). By way of example, a graphical user interface 126 is controlled to display a real-time listing of the suppression rules 110 on an enterprise device 104. The graphical user interface 126 may also display other suppression rules data 202 along with the listing of the suppression rules 110, such as the parameters 206 and the modification data 208. For example, the graphical user interface 126 can be controlled to display the suppression rule 110, as well as a length of the suppression rule 110 based on the length parameter 210, a state of the suppression rule 110 based on the state parameter 212, and a date of the last modification to the suppression rule 110 based on the modification data 208. Indeed, the graphical user interface 126 may be configured in a variety of different ways to display a variety of different parameters and characteristics of the suppression rules 110 without departing from the spirit or scope of the described techniques.

User input to modify a parameter of a suppression rule listed in the graphical user interface is received via at least one graphical control of the graphical user interface displayed on the display device (block 906). By way of example, the graphical user interface 126 obtains user input 214 to modify a parameter 206 of the suppression rules 110. For example, the user input may be received via a graphical control of the graphical user interface 126 to modify the length parameter 210 or to modify the state parameter 212, such as by toggling the suppression rule 110 on or off A modification request is communicated over the enterprise network to the enterprise server (block 908). In accordance with the principles discussed herein, the modification request includes the modified parameter and causes the enterprise server to update the suppression rules stored in the centralized enterprise database.

Having described example procedures in accordance with one or more implementations, consider now an example system and device that can be utilized to implement the various techniques described herein.

Example System and Device

FIG. 10 illustrates an example system generally at 1000 that includes an example computing device 1002 that is representative of one or more computing systems and/or devices that may implement the various techniques described herein. This is illustrated through inclusion of the contact management suppression rules system 102. The computing device 1002 may be, for example, a server of a enterprise or service provider, a device associated with a client (e.g., an enterprise device 104), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are system-independent, meaning that the techniques may be implemented on a variety of commercial computing systems having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a system 1016 as described below.

The cloud 1014 includes and/or is representative of a system 1016 for resources 1018. The system 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The system 1016 may abstract resources and functions to connect the computing device 1002 with other computing devices. The system 1016 may also serve to abstract scaling of resources to provide a corresponding level of scale to encountered demand for the resources 1018 that are implemented via the system 1016. Accordingly, in an interconnected device embodiment, implementation of functionality described herein may be distributed throughout the system 1000. For example, the functionality may be implemented in part on the computing device 1002 as well as via the system 1016 that abstracts the functionality of the cloud 1014.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control distribution of content using suppression rules of an enterprise, a system comprising:

a centralized enterprise database to store the suppression rules of the enterprise, each suppression rule including logic to prevent communication of content of the enterprise to contacts satisfying parameters of the respective suppression rule; and a suppression rules manager implemented at least partially in hardware of at least one enterprise server to:

cause display of a real-time listing of the suppression rules in a graphical user interface displayed by at least one enterprise device, the graphical user interface graphically indicating, for each of the suppression rules, a length parameter corresponding to a length of the suppression rule and a state parameter indicating whether the suppression rule is enabled or disabled;

receive, from the at least one enterprise device, a modification request to modify a parameter of a suppression rule along with a user-provided modification reason for the modified parameter, the modification request initiated based on user input to the graphical user interface;

update the suppression rules stored in the centralized enterprise database with the modified parameter of the suppression rule when the modification request includes the user-provided modification reason, wherein the suppression rules manager prevents the update to the suppression rules when the user-provided modification reason is not included with the modification request;

automatically communicate a notification to other users of the enterprise identifying the modified parameter of the suppression rule and the user-provided modification reason; and a communication module implemented at least partially in hardware of the at least one enterprise server to control distribution of the content for a campaign by preventing communication of the content to the contacts based on the updated suppression rules.

2. A system as described in claim 1, wherein the campaign includes a distribution list of contacts to receive the content, and wherein the communication module prevents contacts included in the distribution list of contacts that satisfy the modified parameter of the suppression rule from receiving the content.

3. A system as described in claim 1, wherein the modification request comprises a request to modify the length parameter of the suppression rule.

4. A system as described in claim 1, wherein the modification request comprises a request to modify the state parameter of the suppression rule.

5. A system as described in claim 1, wherein the suppression rules manager obtains the suppression rules from the centralized enterprise database via a private network of the enterprise.

6. In a digital medium environment to modify suppression rules of an enterprise, a method implemented by an enterprise device, the method comprising:
receiving, at the enterprise device, suppression rules of the enterprise maintained in a centralized enterprise database;
displaying, on a display device of the enterprise device, a real-time listing of the suppression rules in a graphical user interface along with graphical controls to modify parameters of the suppression rules, the graphical user interface graphically indicating, for each of the suppression rules, a length parameter corresponding to a length of the suppression rule and a state parameter indicating whether the suppression rule is enabled or disabled;
receiving, via at least one graphical control of the graphical user interface displayed on the display device, user input to modify a parameter of a suppression rule listed in the graphical user interface, the user input further specifying a reason for modifying the parameter of the suppression rule; and
communicating, to an enterprise server via an enterprise network, a modification request that includes the modified parameter, the modification request causing the enterprise server to update the suppression rules maintained in the centralized enterprise database and to automatically communicate a notification to other users of the enterprise identifying the modified parameter of the suppression rule and the reason for modifying the parameter, wherein the enterprise server is prevented from updating the suppression rules when the reason for modifying the parameter of the suppression rule is not included with the user input.

7. The method of claim 6, wherein the graphical user interface includes at least a length control to modify the length parameter of the suppression rules and a state control to modify the state parameter of the suppression rules.

8. The method of claim 7, wherein the state control is selectable to disable or enable each respective suppression rule.

9. The method of claim 6, wherein the suppression rules include logic to prevent contacts satisfying one or more parameters of each respective suppression rule from receiving content.

10. The method of claim 6, further comprising:
detecting that the reason for modifying the parameter of the suppression rule is not specified with the user input [[to modify the parameter of the suppression rule]];
causing display of a digital prompt in the graphical user interface requesting that the reason for modifying the parameter be provided;
receiving, via the graphical control, additional user input specifying the reason for modifying the parameter of the suppression rule; and
communicating the modification request along with the reason for modifying the parameter of the suppression rule to the enterprise server.

11. In a digital medium environment to control distribution of content using suppression rules of an enterprise, a method comprising:
maintaining, in a centralized enterprise database, the suppression rules of the enterprise, each suppression rule including logic to prevent communication of the content of the enterprise to contacts satisfying parameters of a respective suppression rule;
causing display of a real-time listing of the suppression rules in a graphical user interface displayed by at least one enterprise device, the graphical user interface graphically indicating, for each of the suppression rules, a length parameter corresponding to a length of the suppression rule and a state parameter indicating whether the suppression rule is enabled or disabled;
receiving, from the at least one enterprise device, a modification request to modify a parameter of a suppression rule along with a user-provided modification reason for the modified parameter, the modification request initiated based on user input to the graphical user interface;
updating the suppression rules stored in the centralized enterprise database with the modified parameter of the suppression rule, wherein the suppression rules are not updated when the user-provided modification reason is not included with the modification request;
automatically communicating a notification to other users of the enterprise identifying the modified parameter of the suppression rule and the user-provided modification reason; and
controlling distribution of the content for a campaign by preventing communication of the content to contacts based on the updated suppression rules.

12. A method as described in claim 11, wherein the controlling distribution includes removing contacts from an intended contact distribution list of the content based on the updated suppression rules.

13. A method as described in claim 11, wherein the centralized enterprise database comprises a single centralized enterprise database.

14. A system as described in claim 2, wherein the suppression rules manager updates the suppression rules by storing the user-provided modification reason with the modified parameter in the centralized enterprise database, and wherein the user-provided modification reason is viewable in the graphical user interface.

15. A system as described in claim 14, wherein the centralized enterprise database comprises a single centralized enterprise database.

16. A system as described in claim 1, further comprising a suggestion engine that generates at least one suppression rule modification suggestion, and displays the suppression rule modification suggestion in the graphical user interface.

17. A system as described in claim 16, wherein the suggestion engine generates suppression rule modification suggestions comprising:
a suggestion to modify the length parameter of the at least one suppression rule by increasing the length of the length parameter;
a suggestion to modify the length parameter of the at least one suppression rule by decreasing the length of the length parameter;
a suggestion to modify the state parameter of the at least one suppression rule from enabled to disabled; and a suggestion to modify the state parameter of the at least one suppression rule from disabled to enabled.

18. A method as described in claim 11, wherein the updating comprises storing the user-provided modification reason with the modified parameter in the centralized enterprise database, and wherein the user-provided modification reason is viewable in the graphical user interface.

19. A method as described in claim 18, wherein the centralized enterprise database comprises a single centralized enterprise database.

20. A method as described in claim 11, further comprising generating at least one suppression rule modification suggestion, and displaying the suppression rule modification suggestion in the graphical user interface.

* * * * *

UNITED STATES PATENT AND TRADEMARK OFFICE
CERTIFICATE OF CORRECTION

PATENT NO.        : 11,120,457 B2
APPLICATION NO.   : 16/382183
DATED             : September 14, 2021
INVENTOR(S)       : Rina Sharma, Harminder Saini and Warren Weilun Lee It is certified that error appears in the above-identified patent and that said Letters Patent is hereby corrected as shown below:

In the Claims

Column 21 Line 61, after "user input", delete "[[to modify the parameter of the suppression rule]]".

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*